United States Patent
Wurmfeld (10) Patent No.: US 11,876,804 B2
(45) Date of Patent: Jan. 16, 2024

(54) SYSTEMS AND METHODS FOR PROVIDING ACCESS TO A SECURE DEVICE

(71) Applicant: Capital One Services, LLC, McLean, VA (US)

(72) Inventor: David Kelly Wurmfeld, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 345 days.

(21) Appl. No.: 17/381,223

(22) Filed: Jul. 21, 2021

(65) Prior Publication Data

US 2023/0024880 A1    Jan. 26, 2023

(51) Int. Cl.
*H04L 9/40* (2022.01)
*H04W 12/06* (2021.01)

(52) U.S. Cl.
CPC .......... *H04L 63/102* (2013.01); *H04L 63/083* (2013.01); *H04L 63/0853* (2013.01); *H04W 12/06* (2013.01); *H04L 2463/082* (2013.01)

(58) Field of Classification Search
CPC . H04L 63/0853; H04L 63/083; H04L 63/102; H04L 2463/082; H04L 9/3228;
(Continued)

(56) References Cited

U.S. PATENT DOCUMENTS 8,843,752 B1 * 9/2014 Priyadarshi ......... H04L 63/0823
                                                          713/168
9,123,986 B2    9/2015 Shamblin et al.
(Continued)

FOREIGN PATENT DOCUMENTS

EP       3149597 B1      4/2017
WO   WO-2020087110 A1 *  5/2020  ............. G06F 21/35

OTHER PUBLICATIONS

M. Karabacak, B. Peköz, G. Mumcu and H. Arslan, "Arraymetrics: Authentication Through Chaotic Antenna Array Geometries," in IEEE Communications Letters, vol. 25, No. 6, pp. 1801-1804, Jun. 2021. (Year: 2021).*

(Continued)

*Primary Examiner* — Kari L Schmidt
(74) *Attorney, Agent, or Firm* — TROUTMAN PEPPER HAMILTON SANDERS LLP; Christopher J. Forstner; John A. Morrissett (57) ABSTRACT

A system may receive first level authentication data from a first user, authorize first level access to a secure device, and transmit a push notification including a second factor authentication key to a first user device responsive to first factor authentication data matching stored authentication data for the first user. The system may receive a wireless communication from the first user device attenuated by one or more beam attenuating materials to form a first attenuated beam profile. In response to a match of the first attenuated beam profile to a stored beam profile beyond a predetermined threshold, the system may associate the second factor authentication key as an authorized login credential for the first user. The system may receive the second factor authentication key from the first user and authorize the second factor authentication data to grant the first user second level access to the secure device.

20 Claims, 4 Drawing Sheets

(58) Field of Classification Search
CPC ...... H04L 9/3234; H04W 12/06; H04W 4/80; G06F 21/42; G06F 21/34; G06F 21/30
See application file for complete search history.

(56) References Cited

U.S. PATENT DOCUMENTS

| | | | |
|---|---|---|---|
| 9,805,370 B1* | 10/2017 | Quigley | H04W 12/033 |
| 10,075,807 B2* | 9/2018 | Canoy | H04W 40/244 |
| 10,108,791 B1* | 10/2018 | Masterman | G06F 21/316 |
| 10,121,331 B1 | 11/2018 | Hodges et al. | |
| 10,769,897 B1 | 9/2020 | Miller | |
| 2003/0159050 A1* | 8/2003 | Gantman | G06Q 20/3829 |
| | | | 713/184 |
| 2014/0161257 A1* | 6/2014 | Dube | G01S 19/14 |
| | | | 380/258 |
| 2015/0046989 A1* | 2/2015 | Oberheide | H04L 63/0876 |
| | | | 726/6 |
| 2015/0172921 A1* | 6/2015 | Wang | H04L 9/3231 |
| | | | 726/3 |
| 2016/0364729 A1* | 12/2016 | Ruparelia | G06Q 20/1085 |
| 2020/0204566 A1* | 6/2020 | Zhong | H04W 12/06 |
| 2021/0406861 A1* | 12/2021 | Edmiston | H04W 12/79 |

OTHER PUBLICATIONS

Zhou, Bing, et al. "EchoPrint: Two-factor authentication using acoustics and vision on smartphones." Proceedings of the 24th Annual International Conference on Mobile Computing and Networking. 2018. (Year: 2018).*

A. A. S. AlQahtani, H. Alamleh and J. Gourd, "0EISUA: Zero Effort Indoor Secure User Authentication," in IEEE Access, vol. 8, pp. 79069-79078, 2020. (Year: 2020).*

* cited by examiner

SYSTEMS AND METHODS FOR PROVIDING ACCESS TO A SECURE DEVICE

FIELD

The disclosed technology relates to systems and methods for providing access to a secure device. In particular, the disclosed technology relates to receiving an attenuated wireless communication from a first user, comparing the attenuated beam profile to a stored beam profile, and providing access to a secure device in response to the attenuated beam profile matching the stored beam profile beyond a predetermined threshold.

BACKGROUND

Customers often interact with ATMs, transaction kiosks, and other secure devices to perform financial transactions. With the advent of smartphone technology, customers may now access transaction kiosks wirelessly using a smartphone. However, allowing customers to transact wirelessly with secure devices leads to decreased security by allowing bad actors to intercept or spoof wireless signals to or from a transaction kiosk, which can allow a bad actor to gain access to private financial information or even intercept a customer's funds.

Accordingly, there is a need for improving the security of transaction kiosks by enabling secure wireless transactions between a customer mobile device and a transaction kiosk. Embodiments of the present disclosure are directed to this and other considerations.

SUMMARY

Disclosed embodiments may include a system for providing access to a secure device. The system may include one or more processors, one or more beam attenuating materials, and a memory in communication with the one or more processors and storing instructions that are configured to cause the system to perform the steps of a method. For example, the system may receive first factor authentication data from a first user. In response to the first factor authentication data matching stored authentication data for the first user, the system may transmit a push notification to a first user device that is associated with the first user. The push notification may include a second factor authentication key. The system may receive a wireless communication from the first user device. The wireless communication may be attenuated by the one or more beam attenuating materials and may form a first attenuated beam profile. The system may compare the first attenuated beam profile to a stored beam profile and in response to the first attenuated beam profile matching the stored beam profile beyond a predetermined threshold, the system may associate the second factor authentication key as an authorized login credential for the first user. The system may receive second factor authentication data that includes the second factor authentication key from the first user, and authorize the second factor authentication data to grant the first user access to the secure device.

Disclosed embodiments may include a system for providing access to a secure device. The system may include one or more processors, and a memory in communication with the one or more processors and storing instructions that when executed by the one or more processors, are configured to cause the system to perform steps of a method. For example, the system may receive first factor authentication data from a first user. In response to the first factor authentication data matching stored authentication data for the first user, the system may authorize first level access to the secure device. The system may transmit a push notification that includes a second factor authentication key to a first user device associated with the first user. The system may receive a wireless communication from the first user device. The wireless communication may be attenuated by a beam attenuating material that surrounds the secure device. The attenuated wireless communication may form a first attenuated beam profile. The system may compare the first attenuated beam profile to a stored beam profile, and in response to the first attenuated beam profile matching the stored beam profile beyond a predetermined threshold, the system may associate the second factor authentication key as an authorized login credential for the first user. The system may receive second factor authentication data including the second factor authentication key from the first user, and authorize the second factor authentication data to grant he first user second level access to the secure device.

Disclosed embodiments may include a method for providing access to a secure device. The method may include receiving first factor authentication data form a first user. In response to first factor authentication data matching stored authentication data for the first user, the method may include authorizing first level access to the secure device. The method may include transmitting a push notification that includes a second factor authentication key to a first user device associated with the first user. The method may include receiving a wireless communication from the first user device that is attenuated by a beam attenuating material that surrounds the secure device to form a first attenuated beam profile. The method may include comparing the first attenuated beam profile to a stored bema profile and in response to the first attenuated bema profile matching the stored bema profile beyond a predetermined threshold, the method may include associating the second factor authentication key as an authorized login credential for the first user. The method may include receiving second factor authentication data that includes the second factor authentication key from the first user and authorizing the second factor authentication data to grant the first user second level access to the secure device.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate generally to providing access to a secure device by using beam attenuating materials to shape a beam profile of a wireless transmission communicating with the secure device. When the beam profile matches a stored bema profile, a user is granted access to the secure device. The systems and methods described herein are necessarily rooted in computer technology as they relate to receiving attenuating wireless communications and determining whether the beam profile of the received wireless communication matches a stored beam profile beyond a predetermined threshold of similarity. In some instances, the system utilizes a machine learning model to determine that the received beam profile matches the stored beam profile. Machine learning models are a unique computer technology that involves training the models to complete a task, such as determining whether a received beam profile matches a stored beam profile, by feeding the models with labeled data sets so the machine learning models learn how to rank or score the training data sets and apply the same similarity ranking or scoring to unlabeled data sets. Importantly, examples of the present disclosure improve the speed with which computers can determine that a received beam profile matches a stored beam profile beyond a predetermined threshold based on the score the machine learning model generates.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
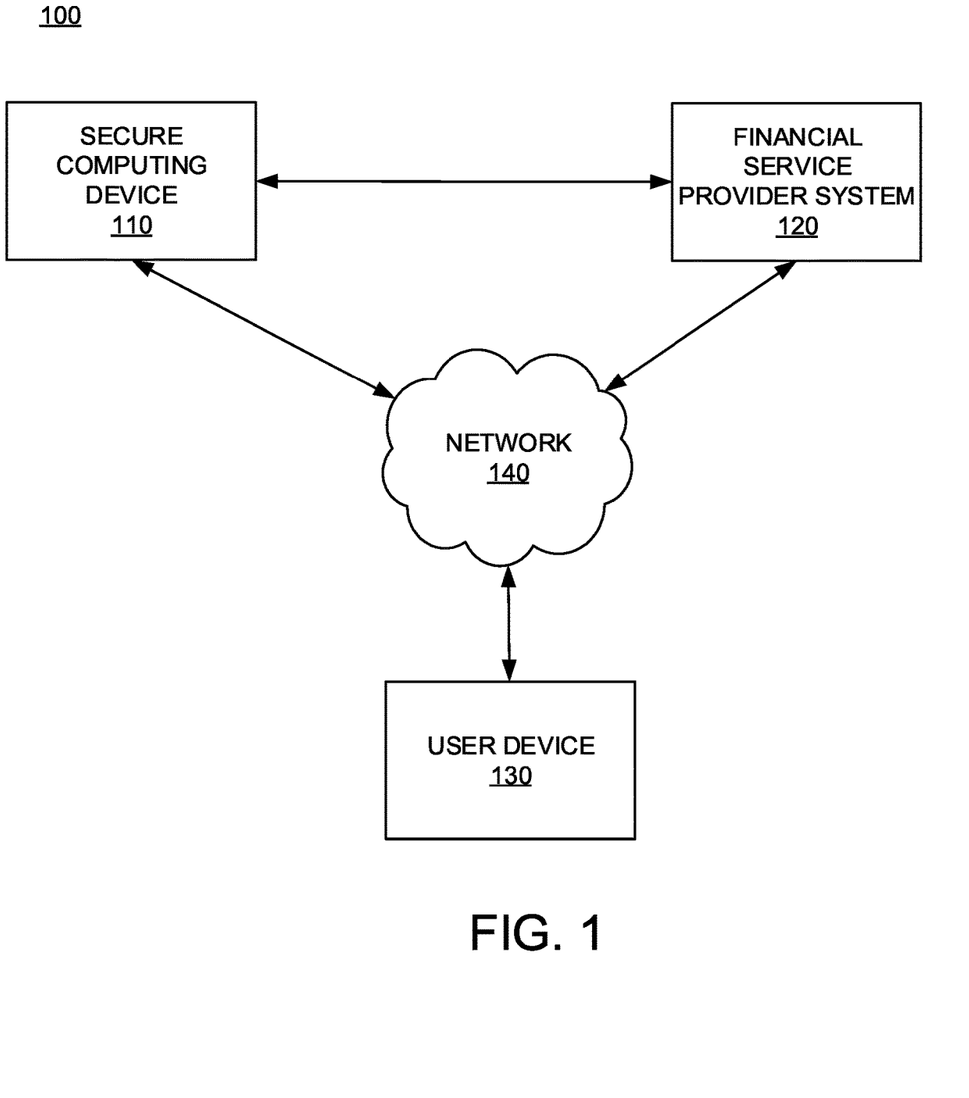
FIG. 1 is a block diagram of an example system that may be used to provide access to a secure device, according to an example implementation of the disclosed technology.

FIG. 1 is a block diagram of an example system that may be used to access a secure device, according to an example implementation of the disclosed technology. The components and arrangements shown in FIG. 1 are not intended to limit the disclosed embodiments as the components used to implement the disclosed processes and features may vary. As shown, secure computing device 110 may interact with a user device 130 and a financial service provider system 120 via a network 140.

In some embodiments, a user may operate the user device 130. The user device 130 can include one or more of a mobile device, smart phone, general purpose computer, tablet computer, laptop computer, telephone, PSTN landline, smart wearable device, voice command device, other mobile computing device, or any other device capable of communicating with the network 140 and ultimately communicating with one or more components of system 100. In some embodiments, the user device 130 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the financial service provider system 120. According to some embodiments, the user device 130 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 140 may be of any suitable type, including individual connections via the Internet such as cellular or WiFi networks. In some embodiments, the network 140 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, long range (LoRa™) low power communications protocols, long range low power wide area network protocols (LoRaWAN™), USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 140 may include any type of computer networking arrangement used to exchange data. For example, the network 140 may be the Internet, a private data network, virtual private network using a public network, and/or other suitable connection(s) that enable(s) components in the system 100 environment to send and receive information between the components of the system 100. The network 140 may also include a public switched telephone network ("PSTN") and/or a wireless network.

In accordance with certain example implementations of the disclosed technology, the system 100 may include one or more computer systems configured to compile data from a plurality of sources including the user device 130, the secure computing device 110, and/or the financial service provider 120. The secure computing device 110 may correlate compiled data, analyze the compiled data, arrange the compiled data, generate derived data based on the compiled data, and store the compiled and derived data in a database, such as database 260, as described more fully with respect to FIG. 2. According to some embodiments, the database 260 may be a database associated with an organization and/or a related entity that stores a variety of information relating to customers, transactions, ATM, and business operations.

Figure 2:
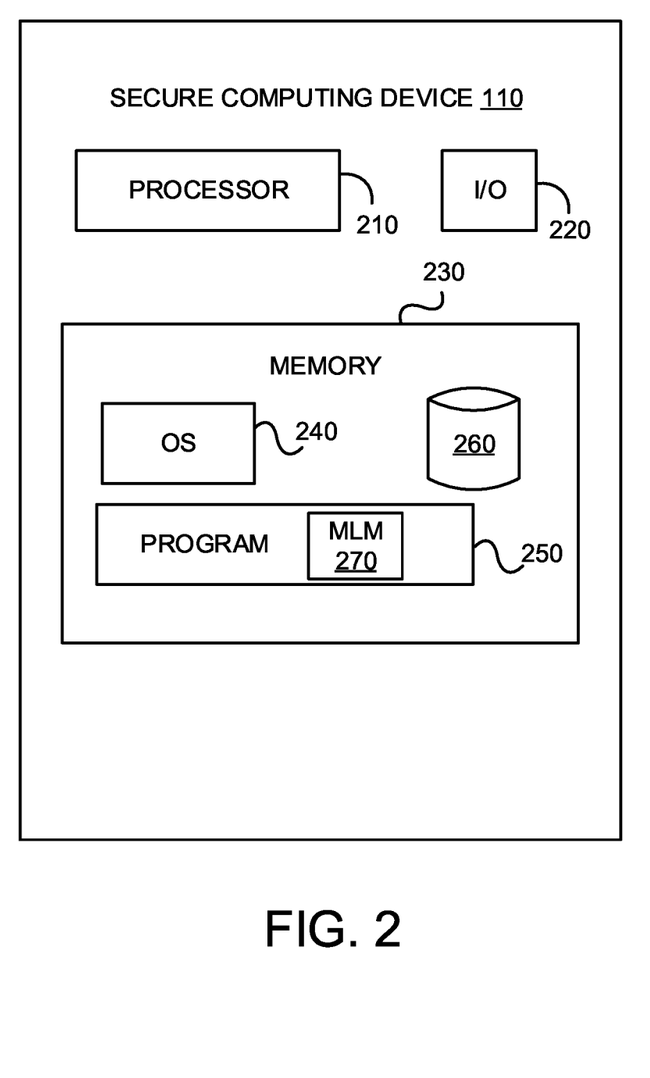
FIG. 2 is a block diagram of an example secure computing device, according to an example implementation of the disclosed technology.

FIG. 2 is a block diagram of an example secure computing device 110 which provides access to a customer via an attenuated wireless transmission received from a user device 130, according to an example implementation of the disclosed technology. According to some embodiments, the user device 130, and financial service provider system 120, as described with respect to FIG. 1, may have a similar structure and components that are similar to those described with respect to secure computing device 110 shown in FIG. 2. As shown, the proximity detection device 120 may include a processor 210, an input/output ("I/O") device 220, a memory 230 containing an operating system ("OS") 240 and a program 250. In certain example implementations, the secure computing device 110 may be a single server or may be configured as a distributed computer system including multiple servers or computers that interoperate to perform one or more of the processes and functionalities associated with the disclosed embodiments. In some embodiments secure computing device 110 may be one or more servers from a serverless or scaling server system. In some embodiments, the secure computing device 110 may further include a peripheral interface, a transceiver, a mobile network interface in communication with the processor 210, a bus configured to facilitate communication between the various components of the secure computing device 110, and a power source configured to power one or more components of the secure computing device 110.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the secure computing device 110 may include one or more storage devices configured to store information used by the processor 210 (or other components) to perform certain functions related to the disclosed embodiments. In one example, the secure computing device 110 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the secure computing device 110 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the secure computing device 110 may include the memory 230 that may include one or more programs 250 to perform one or more functions of the disclosed embodiments.

In some embodiments, the secure computing device 110 may include a trained machine learning model 270 for determining whether a received beam profile matches a stored beam profile beyond a predetermined threshold of similarity, in accordance with a model that may be continuously or intermittently updated. Moreover, the processor 210 may execute one or more programs 250 located remotely from the system 100 (such as the system shown in FIG. 1). For example, the system 100 may access one or more remote programs 250 (such as the trained machine learning model 270), that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing data related to training datasets for determining whether objects detected are human to enable the secure computing device 110 to perform one or more of the processes and functionalities associated with the disclosed embodiments.

The database 260 may include stored data relating to training datasets (e.g., labeled training datasets that are configured to train the secure computing device 110 to determine whether a received wireless communication has a beam profile that matches a stored beam profile) detected object is a human). According to some embodiments, the functions provided by the database 260 may also be provided by a database that is external to the secure computing device 110.

The secure computing device 110 may also be communicatively connected to one or more memory devices (e.g., databases) locally or through a network. The remote memory devices may be configured to store information and may be accessed and/or managed by the secure computing device 110. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The secure computing device 110 may also include one or more I/O devices 220 that may comprise one or more interfaces for receiving signals or input from devices and providing signals or output to one or more devices that allow data to be received and/or transmitted by the secure computing device 110. For example, the secure computing device 110 may include interface components, which may provide interfaces to one or more input devices, such as one or more keyboards, mouse devices, touch screens, track pads, trackballs, scroll wheels, digital cameras, microphones, sensors, and the like, that enable the secure computing device 110 to receive data from a user (such as, for example, via the user device 130), and/or financial service provider system 120.

In example embodiments of the disclosed technology, the secure computing device 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the secure computing device 110 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the secure computing device 110 may include a greater or lesser number of components than those illustrated.

Figure 3:
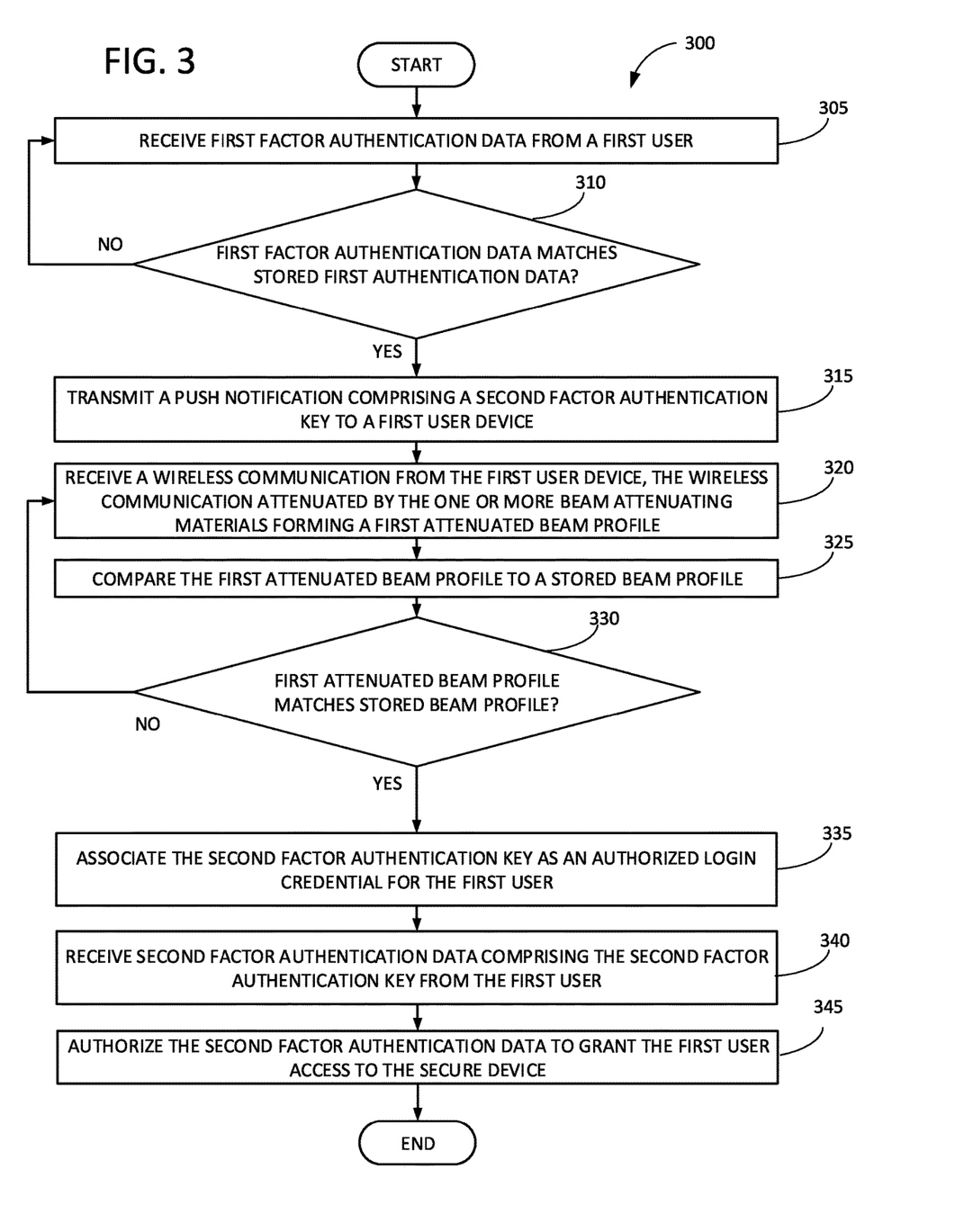
FIG. 3 is a flow diagram illustrating an exemplary method for providing access to a secure device, in accordance with certain embodiments of the disclosed technology.

FIG. 3 is a flow diagram illustrating an exemplary method for providing access to a secure device, in accordance with certain embodiments of the disclosed technology. The steps of method 300 may be performed by one or more components of the system 100 (e.g., secure computing device 110, user device 130, and/or financial service provider system 120).

In block 305, the system (e.g., secure computing device 110) may receive first factor authentication data from a first user. For example, the user may input a username and password, security PIN, or may swipe a card associated with an account of the first user.

In decision block 310, the system (e.g., secure computing device 110) may determine whether first factor authentication data matches stored first authentication data. For example, the system may compare data read from a transaction card input by the first user to stored transaction card data associated with the first user's account. In some embodiments, the first user may input a PIN and insert a transaction card, in which case the system may determine the first user account based on data read from the transaction card, and may verify the first user's identity based on the PIN matching a stored PIN associated with the first user's account. In some embodiments, the first user may enter a username and password into the secure computing device 110. The secure computing device 110 may use the username to identify a user account associated with the first user and may determine whether to grant access to the first user based on the entered password matching a stored password associated with the first user. In response to first factor authentication data matching stored authentication data for the first user, the system may transmit a push notification that includes a second factor authentication key to a first user device associated with the first user in block 315. In response to the first factor authentication data not matching stored first authentication data, the method may return to block 305.

In block 315, the system may transmit a push notification that includes a second factor authentication key to a first user device. For example, the system (e.g., secure computing device 110) may determine that the first user has a first user device associated with the first user account by querying a system that manages the account associated with the first user (e.g., financial service provider system 120). For example, after the secure computing device 110 queries financial service provider system 120, the secure computing device 110 may determine a first user device identifier associated with the first user device. For example, the financial service provider system 120 may provide the secure computing device 110 with one or more of an associated email address, phone number, IP address, MAC address, and the like, which the system may use to transmit a push notification to the user device (e.g., user device 130). The second factor authentication key may be an alphanumeric string generated by one of the components of system 100 (e.g., secure computing device 110 and/or financial service provider system 120) based on the first factor authentication data matching the stored authentication data for the first user.

In block 320, the system may receive a wireless communication from the first user device. The wireless communication may be attenuated by one or more beam attenuating materials that surround the secure computing device 110. For example, the one or more beam attenuating materials may be made of carbon, metal, or cement, or any other material that is of sufficient density to reduce the effective wireless signal strength of the wireless communication received from first the user device (e.g., user device 130). The secure computing device 110 may be configured to measure and store beam profiles from user devices (e.g., user device 130). The size, density, and positioning of the beam attenuating materials may cause the wireless communication received from the wireless computing device to have a characteristic wireless spectrum, or beam profile, which may be compared to stored beam profile to determine whether to authenticate a user. According to some embodiments, the beam attenuating materials may be configured to reduce an effective range of a wireless signal (e.g., a wireless communication) to an effective range of less than 1 meter. The advantages of reducing the effective range of the wireless communication may include that bad actors who may attempt to spoof a wireless communication will no longer be able to do so from a large distance away from the first user device 130 and/or the secure computing device 110. In some embodiments, the beam profile may have a characteristic signature based on the size, density, and positioning of the beam attenuating materials.

According to some embodiments, the beam profile may be measured and expressed as a power spectral density. Power spectral density may be considered the measure of a signal's power as a function of frequency per unit of frequency. The transaction kiosk (e.g., secure computing device 110) may include a spectrum analyzer capable of measuring the beam profile of signals received from devices, such as the first user's device (e.g. user device 130). The beam profile's power spectral density may be expressed in units such as decibel milliwatts per megahertz (dBm/MHz), although other unit measurements, such as watts per hertz (W/Hz) are not precluded. According to some embodiments, the power spectral density associated with the beam profile may be accurately estimated by the system (e.g., secure computing device 110) by measuring the magnitude of the short-time Fourier transform of the attenuated wireless communication received from the first user device.

In block 325, the system (e.g., secure computing device 110) may compare the first attenuated beam profile to a stored beam profile. According to some embodiments, the stored beam profile may be a unique wireless spectrum signature associated with the first user device associated with the first user account. In some embodiments, the stored beam profile may instead be universal and only vary based on the positioning of the first user device 130 in relation to the secure computing device 110.

In decision block 330, the system may determine whether the first attenuated beam profile matches the stored beam profile beyond a predetermined threshold of similarity. When the first attenuated beam profile matches the stored beam profile beyond a predetermined threshold of similarity, the system may associate the second factor authentication key as an authorized login credential for the first user in block 335. When the first attenuated beam profile does not match the stored beam profile beyond the predetermined threshold of similarity, the method may move to block 320.

In block 335, the system may associate the second factor authentication key as an authorized login credential for the first user. The second factor authentication key may be associated with an authorized login credential for the first user in response to the attenuated beam profile received in step 320 matching a stored beam profile beyond a predetermined threshold of similarity. A matching beam profile may indicate that the positioning of the first user device is within a location directly proximate to the transaction kiosk (e.g., secure computing device 110), as indicated by the measured power spectral density of the attenuated wireless communication from the first user's device (e.g., user device 130).

In block 340, the system may receive second factor authentication data from the first user. The second factor authentication data may include the authorized second factor authentication key. According to some embodiments, the key may be manually input by the first user into the transaction kiosk (e.g., secure computing device 110) by using an input/output device associated with the transaction kiosk, such as a touchscreen or keypad. In some embodiments, after successfully matching the received beam profile to the stored beam profile, the transaction kiosk may receive the second factor authentication key wirelessly from a user device associated with the first user (e.g., user device 130).

In block 345, the system (e.g., secure computing device 110) may authorize the second factor authentication data to grant the first user access to the secure device. For example, after inputting the second factor authentication key to the transaction kiosk, the user may have the ability to perform financial transactions such as making deposits or withdrawals from his financial account, checking his balance, etc.

Figure 4:
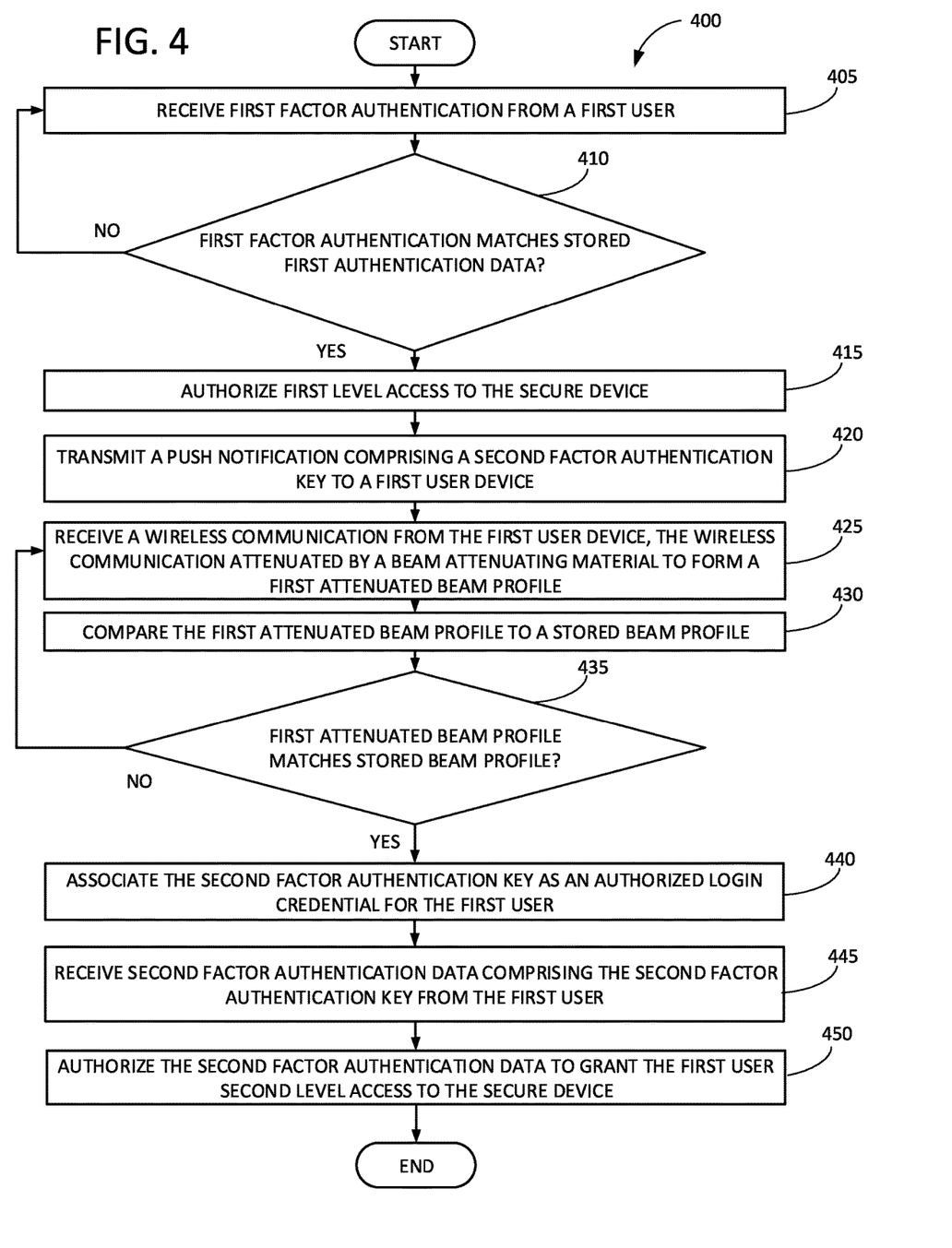
FIG. 4 is a flow diagram illustrating an exemplary method for providing first level and second level access to a secure device, in accordance with certain embodiments of the disclosed technology.

FIG. 4 is a flow diagram illustrating an exemplary method for providing first level and second level access to a secure device, in accordance with certain embodiments of the disclosed technology. The steps of method 400 may be performed by one or more components of the system 100 (e.g., secure computing device 110, user device 130, and/or financial service provider system 120).

Method 400 of FIG. 4 is similar to method 300 of FIG. 3. For example, blocks 405, 410, 420, 425, 430, 435, 440, 445 are substantially similar to blocks 305, 310, 315, 320, 325, 330, 335, and 340 and are not repeated herein for brevity. In block 415, the system, (e.g., secure computing device 110) may grant first level access to the secure device in response to the first factor authentication data matching stored first authentication data. First level access may allow the user to perform low risk operations associated with his account, such as checking an account balance. In block 450, the system (e.g., secure computing device 110) may authorize the second factor authentication data to grant the first user second level access to the secure device. Second level access may be granted based on a received beam profile matching the stored beam profile, and receiving the second factor authentication data from the first user. Second level access may include operations that require a higher level of security, such as making deposits or withdrawals to the user's account, changing a username, password, or PIN, and the like. According to some embodiments, all activities that can be performed by the first user with only first level access are cumulative when second level access to the secure device is granted to the first user. Accordingly, the first user can check an account balance after receiving second level access to the secure device.

Examples of the present disclosure can be implemented according to at least the following clauses:

Clause 1: A system for providing access to a secure device, the system comprising: one or more beam attenuating materials; one or more processors; a memory in communication with the one or more processors and storing instructions that, when executed by the one or more processors, are configured to cause the system to: receive first factor authentication data from a first user; responsive to first factor authentication data matching stored authentication data for the first user, transmit a push notification comprising a second factor authentication key to a first user device associated with the first user; receive a wireless communication from the first user device, the wireless communication attenuated by the one or more beam attenuating materials forming a first attenuated beam profile; compare the first attenuated beam profile to a stored beam profile; responsive to the first attenuated beam profile matching the stored beam profile beyond a predetermined threshold, associate the second factor authentication key as an authorized login credential for the first user; receive second factor authentication data comprising the second factor authentication key from the first user; and authorize the second factor authentication data to grant the first user access to the secure device.

Clause 2: The system of clause 1, wherein the wireless communication comprises a short-range radio wave wireless signal utilizing 2.4 Gigahertz (Ghz) radio frequencies.

Clause 3: The system of clause 2, wherein receiving the second factor authentication data further comprises receiving a second wireless communication from the first user device.

Clause 4: The system of clause 1, wherein the one or more beam attenuating materials are configured to reduce a maximum effective range of the wireless communication to one meter.

Clause 5: The system of clause 1, wherein transmitting the push notification further comprises determining a mobile phone number of the first user device responsive to receiving the first factor authentication data from the first user.

Clause 6: The system of clause 1, wherein the first factor authentication data comprises one or more data types selected from (i) a manually entered security PIN associated with the first user, (ii) a swiped card associated with the first user, (iii) a username and password associated with the first user, or combinations thereof.

Clause 7: A system for providing access to a secure device, the system comprising: one or more processors; a memory in communication with the one or more processors and storing instructions that, when executed by the one or more processors, are configured to cause the system to: receive first factor authentication data from a first user; responsive to first factor authentication data matching stored authentication data for the first user, authorize first level access to the secure device; transmit a push notification comprising a second factor authentication key to a first user device associated with the first user; receive a wireless communication from the first user device, the wireless communication attenuated by a beam attenuating material surrounding the secure device forming a first attenuated beam profile; compare the first attenuated beam profile to a stored beam profile; responsive to the first attenuated beam profile matching the stored beam profile beyond a predetermined threshold, associate the second factor authentication key as an authorized login credential for the first user; receive second factor authentication data comprising the second factor authentication key from the first user; and authorize the second factor authentication data to grant the first user second level access to the secure device.

Clause 8: The system of clause 7, wherein the wireless communication comprises a short-range radio wave wireless signal utilizing 2.4 Gigahertz (Ghz) radio frequencies.

Clause 9: The system of clause 8, wherein receiving the second factor authentication data further comprises receiving a second wireless communication from the first user device.

Clause 10: The system of clause 7, wherein the beam attenuating material is configured to reduce a maximum effective range of the wireless communication to one meter.

Clause 11: The system of clause 7, wherein transmitting the push notification further comprises determining a mobile phone number of the first user device responsive to receiving the first factor authentication data from the first user.

Clause 12: The system of clause 7, wherein first factor authentication data comprises one or more data types selected from (i) a manually entered security PIN associated with the first user, (ii) a swiped card associated with the first user, (iii) a username and password associated with the first user, or combinations thereof.

Clause 13: The system of clause 7, wherein first level access comprises authorization to check an account balance associated with the first user.

Clause 14: The system of clause 7, wherein second level access comprises authorization to make a withdrawal or deposit to an account associated with the first user.

Clause 15: A method for providing access to a secure device comprising: receiving first factor authentication data from a first user; responsive to first factor authentication data matching stored authentication data for the first user, authorizing first level access to the secure device; transmitting a push notification comprising a second factor authentication key to a first user device associated with the first user; receiving a wireless communication from the first user device, the wireless communication attenuated by a beam attenuating material surrounding the secure device to form a first attenuated beam profile; comparing the first attenuated beam profile to a stored beam profile; responsive to the first attenuated beam profile matching the stored beam profile beyond a predetermined threshold, associating the second factor authentication key as an authorized login credential for the first user; receiving second factor authentication data comprising the second factor authentication key from the first user; and authorizing the second factor authentication data to grant the first user second level access to the secure device.

Clause 16: The method of clause 15, wherein the wireless communication comprises a short-range radio wave wireless signal utilizing 2.4 Gigahertz (Ghz) radio frequencies.

Clause 17: The method of clause 16, wherein receiving the second factor authentication data further comprises receiving a second wireless communication from the first user device.

Clause 18: The method of clause 15, wherein transmitting the push notification further comprises determining a mobile phone number of the first user device responsive to receiving first factor authentication from the first user.

Clause 19: The method of clause 15, wherein first factor authentication data comprises one or more data types selected from (i) a manually entered security PIN associated with the first user, (ii) a swiped card associated with the first user, (iii) a username and password associated with the first user, or combinations thereof.

Clause 20: The method of clause 15, wherein first level access comprises authorization to check an account balance associated with the first user and wherein second level access comprises authorization to make a withdrawal or deposit to an account associated with the first user.

Exemplary Use Cases

A user may walk up to a transaction kiosk and insert a debit card and/or enter a PIN associated with the user's account. In response, the transaction kiosk may compare the received PIN with a stored PIN associated with the user's account. If there is a match between the entered PIN and the stored PIN, the transaction kiosk may grant the user first level access to the transaction kiosk, which would allow the user access to low security options within the transaction kiosk, such as checking an account balance. The user may wish to perform a higher security operation, such as making a deposit or withdrawal. Accordingly, the transaction kiosk may identify a mobile device associated with the user, for example by querying a financial service provider system to obtain a phone number or other identifier associated with the user's mobile device. The transaction kiosk may transmit a push notification to the mobile device that contains a generated second factor authentication key. Before the second factor authentication key becomes active (e.g., associated with an authorized login credential for the user's account), the system may require the receipt of a wireless communication from the mobile device. The wireless communication may be detected and analyzed by the transaction kiosk (e.g., using a spectrum analyzer to detect the signal and/or using a short time Fourier transform) to develop a power spectral density measurement of a beam profile associated with the received wireless communication. The beam measured profile (e.g., the power spectral density measurement) may be compared to a stored beam profile, and in response to a match beyond a predetermined threshold, the system may grant second level access to the transaction kiosk.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for providing access to a secure device, the system comprising:
    one or more beam attenuating materials;
    one or more processors;
    a memory in communication with the one or more processors and storing instructions that, when executed by the one or more processors, are configured to cause the system to:
    receive first factor authentication data from a first user;
    responsive to first factor authentication data matching stored authentication data for the first user, transmit a push notification comprising a second factor authentication key to a first user device associated with the first user;
    receive a wireless communication from the first user device, the wireless communication attenuated by the one or more beam attenuating materials forming a first attenuated beam profile;
    compare the first attenuated beam profile to a stored beam profile;
    responsive to the first attenuated beam profile matching the stored beam profile beyond a predetermined threshold, associate the second factor authentication key as an authorized login credential for the first user;
    receive second factor authentication data comprising the second factor authentication key from the first user; and
    authorize the second factor authentication data to grant the first user access to the secure device.

2. The system of claim 1, wherein the wireless communication comprises a short-range radio wave wireless signal utilizing 2.4 Gigahertz (Ghz) radio frequencies.

3. The system of claim 2, wherein receiving the second factor authentication data further comprises receiving a second wireless communication from the first user device.

4. The system of claim 1, wherein the one or more beam attenuating materials are configured to reduce a maximum effective range of the wireless communication to one meter.

5. The system of claim 1, wherein transmitting the push notification further comprises determining a mobile phone number of the first user device responsive to receiving the first factor authentication data from the first user.

6. The system of claim 1, wherein the first factor authentication data comprises one or more data types selected from (i) a manually entered security PIN associated with the first user, (ii) a swiped card associated with the first user, (iii) a username and password associated with the first user, or combinations thereof.

7. A system for providing access to a secure device, the system comprising:
    one or more processors;
    a memory in communication with the one or more processors and storing instructions that, when executed by the one or more processors, are configured to cause the system to:
        receive first factor authentication data from a first user;
        responsive to first factor authentication data matching stored authentication data for the first user, authorize first level access to the secure device;
        transmit a push notification comprising a second factor authentication key to a first user device associated with the first user;
        receive a wireless communication from the first user device, the wireless communication attenuated by a beam attenuating material surrounding the secure device forming a first attenuated beam profile;
        compare the first attenuated beam profile to a stored beam profile;
        responsive to the first attenuated beam profile matching the stored beam profile beyond a predetermined threshold, associate the second factor authentication key as an authorized login credential for the first user;
        receive second factor authentication data comprising the second factor authentication key from the first user; and
        authorize the second factor authentication data to grant the first user second level access to the secure device.

8. The system of claim 7, wherein the wireless communication comprises a short-range radio wave wireless signal utilizing 2.4 Gigahertz (Ghz) radio frequencies.

9. The system of claim 8, wherein receiving the second factor authentication data further comprises receiving a second wireless communication from the first user device.

10. The system of claim 7, wherein the beam attenuating material is configured to reduce a maximum effective range of the wireless communication to one meter.

11. The system of claim 7, wherein transmitting the push notification further comprises determining a mobile phone number of the first user device responsive to receiving the first factor authentication data from the first user.

12. The system of claim 7, wherein first factor authentication data comprises one or more data types selected from (i) a manually entered security PIN associated with the first user, (ii) a swiped card associated with the first user, (iii) a username and password associated with the first user, or combinations thereof.

13. The system of claim 7, wherein first level access comprises authorization to check an account balance associated with the first user.

14. The system of claim 7, wherein second level access comprises authorization to make a withdrawal or deposit to an account associated with the first user.

15. A method for providing access to a secure device comprising:
    receiving first factor authentication data from a first user;
    responsive to first factor authentication data matching stored authentication data for the first user, authorizing first level access to the secure device;
    transmitting a push notification comprising a second factor authentication key to a first user device associated with the first user;
    receiving a wireless communication from the first user device, the wireless communication attenuated by a beam attenuating material surrounding the secure device to form a first attenuated beam profile;
    comparing the first attenuated beam profile to a stored beam profile;
    responsive to the first attenuated beam profile matching the stored beam profile beyond a predetermined threshold, associating the second factor authentication key as an authorized login credential for the first user;
    receiving second factor authentication data comprising the second factor authentication key from the first user; and
    authorizing the second factor authentication data to grant the first user second level access to the secure device.

16. The method of claim 15, wherein the wireless communication comprises a short-range radio wave wireless signal utilizing 2.4 Gigahertz (Ghz) radio frequencies.

17. The method of claim 16, wherein receiving the second factor authentication data further comprises receiving a second wireless communication from the first user device.

18. The method of claim 15, wherein transmitting the push notification further comprises determining a mobile phone number of the first user device responsive to receiving first factor authentication from the first user.

19. The method of claim 15, wherein first factor authentication data comprises one or more data types selected from (i) a manually entered security PIN associated with the first user, (ii) a swiped card associated with the first user, (iii) a username and password associated with the first user, or combinations thereof.

20. The method of claim 15, wherein first level access comprises authorization to check an account balance associated with the first user and wherein second level access comprises authorization to make a withdrawal or deposit to an account associated with the first user.

* * * * *